C. Burleigh,
Friction Clutch.

N° 35,853.          Patented July 8, 1862.

Witnesses.
Norman W. Stearns
R. Westermacher

Inventor:
Charles Burleigh
by his attorney
Samuel Cooper
& Roach

UNITED STATES PATENT OFFICE.

CHARLES BURLEIGH, OF FITCHBURG, MASSACHUSETTS, ASSIGNOR TO THE PUTNAM MACHINE COMPANY, OF SAME PLACE.

IMPROVEMENT IN FRICTION-PULLEYS.

Specification forming part of Letters Patent No. 35,853, dated July 8, 1862.

*To all whom it may concern:*

Be it known that I, CHARLES BURLEIGH, of Fitchburg, in the county of Worcester and State of Massachusetts, have invented an Improved Friction-Pulley, of which the following is a full, clear, and exact description, reference being had to the accompanying drawings, making part of this specification, in which—

Figure 4:
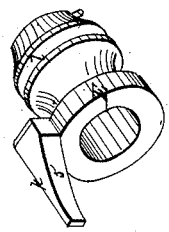
Figure 2:
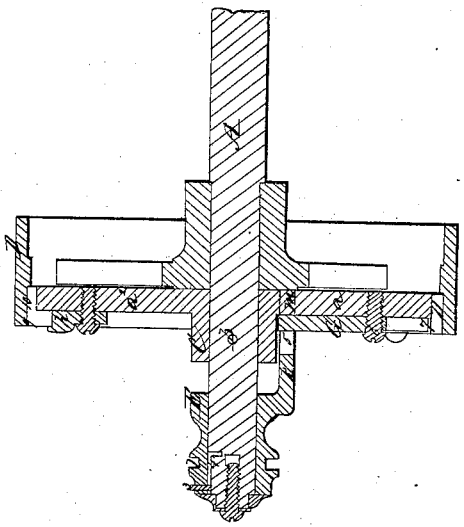
Figure 3:
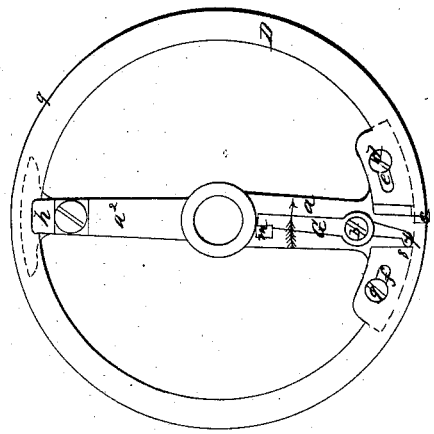
Figure 1:
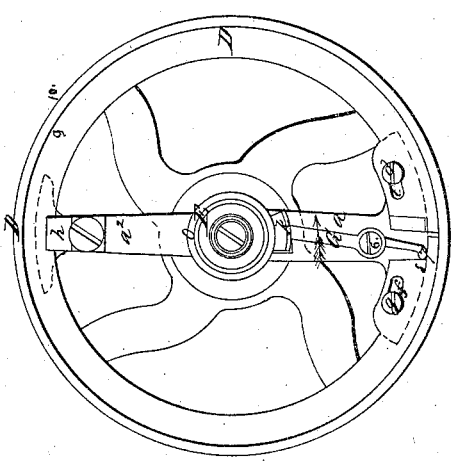

Figure 1 is an end elevation of the pulley; Fig. 2, a section through the same; Fig. 3, the friction-ring detached; Fig. 4, a view of the clutch.

The friction-pulley which is the subject of my present invention is intended for driving lathes and other machinery; and it consists of a pulley running loosely on a shaft and driven by a belt from any suitable power, in combination with a friction-ring connected with the shaft, and which the operator at will causes to engage with the pulley and revolve the shaft.

That others skilled in the art may understand and use my invention, I will proceed to describe the manner in which I have carried it out.

In the said drawings, A is the shaft on which the pulley B runs loosely, being driven by a belt from any suitable power. A hub, C, to which are attached two arms, $a\ a^x$, is secured by a pin, $b$, to the shaft A, and a ring, D, which is cut open at $c$, is attached at one end by a screw, $d$, which passes through a slot, $e$, in the ring to the end of the arm $a$. A slot, $f$, in the other end of the ring receives a screw, $g$, which also screws into the end of the arm $a$. It does not confine this end of the ring, but allows the ring to be expanded in a manner which will be presently explained. A clamp, $h$, screwed on the end of the arm $a^x$, confines the ring D in place, but does not prevent the ring from moving between the clamp and arm when the ring is expanded. A hub, E, (shown detached in Fig. 4,) slides longitudinally on the shaft A, but is prevented from turning round on it by a pin, 3, which enters a slot, 4, in the shaft. It is moved on the shaft by a shipping-lever, which clasps it in a groove, $l$. A pin or clutch, $k$, with an inclined face, 5, projects from the end of this hub E. Its end enters a hole, $m$, in the arm $a$, and its inclined face 5 bears against a lever, G, which is pivoted at 6 to the arm $a$, and vibrates it when the hub E is moved by the shipper toward the pulley.

As the lever G is vibrated in the direction of its arrow, its outer end, 7, presses against the loose end 8 of the ring D, and expands it, (the ring, as stated, being free to move all the way round to where it is secured at $d$,) when the outer face, 9, of the ring, coming into close contact with the inner face, 10, of the pulley, the friction of these surfaces carries the ring along with the pulley, and thus drives the shaft A. When the hub E is moved away from the pulley and the clutch $k$ is drawn back to release the lever C, the spring of the ring D draws its ends together, and the pulley B is again free to revolve without the ring.

The above constitutes a very neat and reliable friction-pulley, in which the large amount of surfaces (viz., the whole periphery of the ring and the inner face, 10, of the pulley) which are brought into contact avoid the necessity of applying much force to hold the ring and pulley together, and very little exertion is necessary to unlock them, as the spring of the ring assists this movement, while it has the further advantage that but a small amount of motion of the hub E or clutch is necessary.

What I claim as my invention, and desire to secure by Letters Patent, is—

The loose pulley B, in combination with the expanding-ring D, connected with the shaft A, and operated substantially in the manner specified.

CHARLES BURLEIGH.

Witnesses:
MOSES FAIRBANKS,
HALE W. PAGE.